UNITED STATES PATENT OFFICE.

HENRY JAS. LIVINGSTON, OF BALTIMORE, MARYLAND.

COMPOSITION OF MATTER FOR INCREASING THE STRENGTH AND DURABILITY OF CEMENTS, &c.

SPECIFICATION forming part of Letters Patent No. 682,724, dated September 17, 1901.

Application filed December 4, 1900. Serial No. 38,708. (No specimens.)

*To all whom it may concern:*

Be it known that I, HENRY JAMES LIVINGSTON, a subject of the Queen of Great Britain, residing at Baltimore, in the State of Maryland, have invented a new and useful Composition of Matter for Increasing the Strength and Durability of Cements and Plasters and the Process of Making the Same, of which the following is a specification.

The composition consists, substantially, of one hundred parts, by weight, of carbon in powder; twenty parts, by weight, of alkaline matter, (soluble,) and two parts, by weight, of saccharine or farinaceous or soluble carbonaceous matter. I find that coke or anthracite coal, with soda crystals (sal-soda) and sugar in proportions as above, give excellent results.

The composition is prepared for use by mixing the materials, substantially in the proportions specified, with water, thoroughly digesting the same, then evaporating the water, and pulverizing the residuum.

I find that five per cent. of this composition added in a powdered form to cements or plasters or ground with them is often about six times as efficacious in increasing their strength as compared with that afforded by the addition of crude or unprepared carbons, such as employed in composition described in United States Patent No. 620,155. This increase of strength over that afforded by the crude carbons is attributable to the action of the soluble alkaline matter now introduced. More or less of the composition may be used as desired and according to the quantity of free lime present in or added to the cement, and a little insoluble alkaline matter may be admitted to the composition before digestion.

What I claim, and desire to secure by Letters Patent of the United States, is—

1. The above-described composition of matter consisting of carbon; soluble carbonaceous matter; and a salt of soda; substantially as described and for the purpose specified.

2. The process of preparing a composition for strengthening cements or plaster which consists in mixing carbon in a powdered form, soluble alkaline matter, and soluble carbonaceous matter, in substantially the proportions specified, with water, then evaporating the mixture to dryness, and finally in pulverizing the product thus obtained.

In testimony whereof I affix my signature in presence of two witnesses.

HENRY JAS. LIVINGSTON.

Witnesses:
　JAMES A. WATSON,
　ARTHUR L. BRYANT.